(12) United States Patent
Koller et al.

(10) Patent No.: US 6,304,613 B1
(45) Date of Patent: Oct. 16, 2001

(54) DATA CARRIER HAVING RECTIFIER AND IMPROVED VOLTAGE LIMITER

(75) Inventors: Manfred Koller; Peter Thüringer, both of Graz (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/304,399

(22) Filed: May 3, 1999

(30) Foreign Application Priority Data

May 5, 1998 (EP) .................................................. 98890127

(51) Int. Cl.[7] ............................. H04L 27/02; G06K 19/00
(52) U.S. Cl. ............................. 375/268; 455/17; 235/492
(58) Field of Search ........................... 235/492; 375/258, 375/320, 316, 219, 223, 259, 268; 363/50, 89; 455/17

(56) References Cited

U.S. PATENT DOCUMENTS

| | | | |
|---|---|---|---|
| 4,650,981 | * | 3/1987 | Foletta .................................. 235/449 |
| 4,818,855 | * | 4/1989 | Mongeon et al. .................... 235/440 |
| 4,899,036 | * | 2/1990 | McCrindle et al. .................. 235/380 |
| 4,928,000 | * | 5/1990 | Eglise et al. .......................... 235/380 |
| 5,202,838 | * | 4/1993 | Inoue ...................................... 702/57 |
| 5,326,965 | * | 7/1994 | Inoue .................................... 235/492 |
| 5,521,590 | * | 5/1996 | Hanaoka et al. ................ 340/825.54 |
| 5,874,829 | * | 2/1999 | Holweg et al. ...................... 323/274 |
| 6,079,622 | * | 6/2000 | Goto .................................... 235/492 |
| 6,134,130 | * | 10/2000 | Connell et al. ......................... 363/89 |

FOREIGN PATENT DOCUMENTS

9638814A2    12/1996 (WO) .

* cited by examiner

Primary Examiner—Young T. Tse

(57) ABSTRACT

A data carrier processing system is provided for receiving an amplitude-modulated carrier signal. The system includes rectifiers and a voltage limiter that limits the d.c. supply voltage that is provided by the rectifiers. The voltage limiter provides a delayed response to amplitude variations in the carrier signal, so as to avoid adverse effects on the modulation of the carrier signal, while also providing an un-delayed response to excess amplitude values, so as to avoid excessive d.c. supply voltage for circuit elements of the data carrier system.

28 Claims, 4 Drawing Sheets

DATA CARRIER HAVING RECTIFIER AND IMPROVED VOLTAGE LIMITER

BACKGROUND OF THE INVENTION

The invention relates to a data carrier comprising the means specified hereinafter, namely receiving means adapted to receive and to supply an amplitude-modulated carrier signal which has been amplitude-modulated in dependence on data to be transmitted, and rectifier means to which the received amplitude-modulated carrier signal can be applied in order to be rectified and which are adapted to generate a d.c. supply voltage corresponding to the received amplitude-modulated carrier signal, and voltage limiting means adapted to limit the d.c. supply voltage generated with the aid of the rectifier means to a first limit value, and amplitude demodulation means to which the received amplitude-modulated carrier signal can be applied in order to be demodulated and which are adapted to supply a data signal representative of the data to be transmitted, and data processing means adapted to process the data signal supplied by the amplitude demodulation means, the data processing means having a power supply input, which power supply input is arranged to receive the d.c. supply voltage.

The invention further relates to a circuit comprising the means specified hereinafter, namely rectifier means to which a received amplitude-modulated carrier signal which has been amplitude-modulated in dependence on data to be transmitted can be applied in order to rectify the carrier signal and which are adapted to generate a d.c. supply voltage corresponding to the received amplitude-modulated carrier signal, and voltage limiting means adapted to limit the d.c. supply voltage generated with the aid of the rectifier means to a first limit value, and amplitude demodulation means to which the received amplitude-modulated carrier signal can be applied in order to be demodulated and which are adapted to supply a data signal representative of the data to be transmitted, and data processing means adapted to process the data signal supplied by the amplitude demodulation means, the data processing means having a power supply input, which power supply input is arranged to receive the d.c. supply voltage.

Such a data carrier of the type defined in the first paragraph and such a circuit of the type defined in the second paragraph are known, for example from the document WO 96/38814 A2. Such a data carrier serves for the contactless communication with a transmitting/receiving station. In order to transmit data from the transmitting/receiving station to such a data carrier (transponder) a carrier signal is amplitude-modulated in the transmitting/receiving station, which amplitude modulation is effected in dependence on the data to be transmitted.

In such data carrier systems comprising at least one transmitting/receiving station and at least one data carrier it is known to carry out an amplitude modulation of the carrier signal with a modulation percentage of 100%. The advantage of such an amplitude modulation essentially resides in the fact that the amplitude modulation means required for this can simply be implemented as an integrated circuit. A disadvantage of such an amplitude modulation with a modulation percentage of 100% is that the sideband signals which occur when this amplitude modulation is used have a comparatively high level, which often gives rise to problems in complying with national regulations as regards spurious emission.

In order to avoid the afore-mentioned problems as a result of sideband signals of comparatively high levels it is also known to use an amplitude modulation with a comparatively low modulation percentage, for example a modulation percentage of approximately 10%.

When such an amplitude modulation with a low modulation percentage is used a data carrier of the type defined in the first paragraph unfortunately has the problem that the voltage limiting means, which are connected to the rectifier means and which serve for limiting the d.c. supply voltage, derived from the received amplitude-modulated carrier signal with the aid of the rectifier means, to a first limit value, counteract the amplitude modulation in the amplitude-modulated carrier signal received by the receiving means and supplied by the receiving means, which results in the amplitude modulation being evened out. Unfortunately, during the demodulation of the received amplitude-modulated carrier signal by means the amplitude demodulation means this evening-out of the amplitude modulation, which is equivalent to a reduction of the modulation percentage, may lead to problems, as a result of which errors may occur in the data signal representing the data to be transmitted and supplied by the amplitude demodulation means, which is obviously undesirable.

SUMMARY OF THE INVENTION

It is an object of the invention to preclude the afore-mentioned problems with a data carrier of the type defined in the first paragraph and with a circuit of the type defined in the second paragraph, in which a received amplitude-modulated carrier signal is amplitude-modulated with a comparatively low modulation percentage, and to provide an improved data carrier and an improved circuit.

In order to achieve this object in a data carrier of the type defined in the first paragraph, the invention provides that as regards their limiting action for limiting the d.c. supply voltage to its first limit value the voltage limiting means are adapted to be controllable by means of a control signal and furthermore respond with a delay to amplitude variations in the received amplitude-modulated carrier signal and that, in addition, the voltage limiting means are adapted to limit the d.c. supply voltage generated with the aid of the rectifier means to a second limit value and their limiting action for limiting the d.c. supply voltage to its second limit value is such that they respond without delay to amplitude variations in the received amplitude-modulated carrier signal, and in that the second limit value attainable by the voltage limiting means is higher than the first limit value attainable by the voltage limiting means.

In order to achieve this object in a circuit of the type defined in the second paragraph, the invention provides that as regards their limiting action for limiting the d.c. supply voltage to its first limit value the voltage limiting means are adapted to be controllable by means of a control signal and furthermore respond with a delay to amplitude variations in the received amplitude-modulated carrier signal and that, in addition, the voltage limiting means are adapted to limit the d.c. supply voltage generated with the aid of the rectifier means to a second limit value and their limiting action for limiting the d.c. supply voltage to its second limit value is such that they respond without delay to amplitude variations in the received amplitude-modulated carrier signal, and that the second limit value attainable by the voltage limiting means is higher than the first limit value attainable by the voltage limiting means.

By taking the measures in accordance with the invention it is achieved by means which can be realized very simple that during normal operation of a data carrier in accordance with the invention and of a circuit in accordance with the invention the voltage limiting means, which serve for limiting the supply voltage to a value which is permissible for the data processing means, always respond with a delay to amplitude variations in the received amplitude-modulated carrier signal, thereby assuring in a very simple manner that amplitude transitions in the received amplitude-modulated carrier signal are not reduced or evened out by the voltage limiting means, i.e. that the modulation percentage of the received amplitude-modulated carrier signal is not reduced. Moreover, by means of the measures in accordance with the invention it is achieved that in the case that a data carrier in accordance with the invention comprising a circuit in accordance with the invention is directly and suddenly brought into the so-called near field of a transmitting/receiving station, i.e. is situated at only a few centimeters from the transmitting/receiving station, the d.c. supply voltage, which in this case is generated with the aid of the rectifier means and which is too high with respect to the permissible d.c. supply voltage for the data processing means, is limited to a safe value for the data processing means by the voltage limiting means which now respond very rapidly. This guarantees that the modulation percentage of the received amplitude-modulated carrier signal is not adversely affected and, as a consequence, practically always a correct demodulation of the carrier signal and thus the generation of an error-free data signal and that, in addition, the data processing means are always protected reliably against an excessive d.c. supply voltage.

As regards the advantageous variants of a data carrier in accordance with the invention as defined in claims 2, 3 and 4 and of a circuit in accordance with the invention as defined in claims 16, 17 and 18 it is to be noted that these variants have proved to be advantageous for a simple and reliable implementation.

As regards the advantageous variants of a data carrier in accordance with the invention as defined in claims 5 and 6 and of a circuit in accordance with the invention as defined in claims 19 and 20 it is to be noted that these variants also enable a correct and reliable implementation to be achieved.

As regards the advantageous variants of a data carrier in accordance with the invention as defined in claims 7, 8 and 9 and of a circuit in accordance with the invention as defined in claims 21, 22 and 23 it is to be noted that these variants have also proved to be advantageous for a simple and reliable implementation.

The advantageous variants of a record carrier in accordance with the invention as defined in claim 10 and of a circuit in accordance with the invention as defined in claim 24 also have the advantage of a particularly simple circuit design.

The first control signal generating means and the second control signal generating means may be arranged directly after the receiving means. However, it has proved to be advantageous if the measures defined in claim 11 are taken.

In such a data carrier as defined in claim 11 it has proved to be particularly advantageous if in addition the measures defined in claim 12 or 13 are taken because these variants respectively have the advantages of a minimal load of a storage capacitor arranged after the rectifier means and a particularly simple circuit design.

The measures defined in claims 14 and 28 also have proved to be advantageous for a particularly simple circuit design.

The afore-mentioned as well as further aspects of the invention will become apparent from the examples of embodiments described hereinafter and will be elucidated with reference to these examples.

BRIEF DESCRIPTION OF THE DRAWING

The invention will be described in more detail with reference to the drawings, which show six examples of embodiments to which the invention is not limited.

DESCRIPTION OF THE PREFERRED EMBODIMENTS

Figure 1:
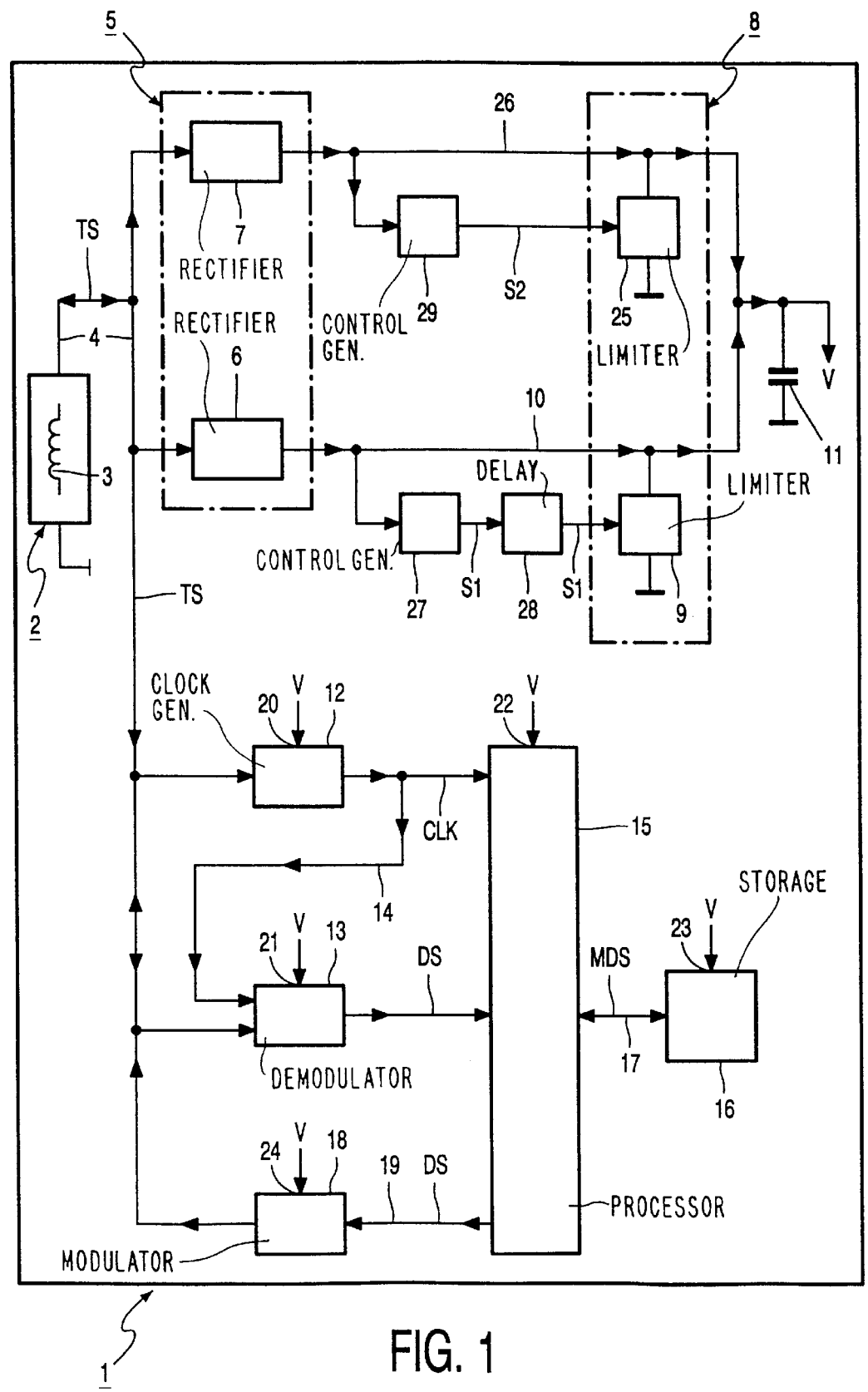
FIG. 1 shows diagrammatically in the form of a block diagram of a data carrier in accordance with a first embodiment of the invention.

FIG. 1 shows a data carrier 1 intended and constructed for the two-way contactless inductive communication with a transmitting/receiving station, not shown in FIG. 1. The data carrier 1 comprises a number of means described hereinafter.

The data carrier 1 includes receiving means 2 adapted to receive and supply an amplitude-modulated carrier signal TS, which has been amplitude-modulated in dependence on data to be transmitted to the data carrier. The modulation percentage of the amplitude-modulated carrier signal TS is then 10%, which means that for the transmission of, for example, one bit the amplitude of the carrier signal TS is varied from a constant maximum amplitude (100%) to a constant reduced amplitude (90%). This measure is well known and therefore it is not elucidated any further. The receiving means 2 include a transmission coil 3, which can be coupled inductively to a transmitting/receiving station by means of a transmission coil, not shown.

Rectifier means 5 are connected to the receiving means 2 via an electrically conductive connection 4. The amplitude-modulated carrier signal TS can be applied to the rectifier means 5 in order to be rectified. The rectifier means 5 serve to generate a d.c. supply voltage V corresponding to the received amplitude-modulated carrier signal TS. The rectifier means 5 comprise a first rectifier stage 6 and a second rectifier stage 7. The two rectifier stages 6 and 7 can each be formed by a bridge rectifier. The two rectifier stages can also be implemented in other ways.

Voltage limiting means 8 are connected to the rectifier means 5. The voltage limiting means 8 are adapted to limit, when necessary, the d.c. supply voltage V generated with the aid of the rectifier means 5 to a first limit value UL1 (see FIG. 2). To limit the d.c. supply voltage V to the first limit value UL1 the voltage limiting means 8 comprise a first voltage limiting stage 9 arranged between an electrically conductive connection 10, which is connected to the output of the first rectifier stage 6, and a reference potential, namely ground. The first voltage limiting stage 9 is followed by a capacitor 11, which serves for smoothing purposes and storage purposes and which is connected to the connection 10, from which capacitor the d.c. supply voltage V can be taken in order to be supplied to those circuit elements of the data carrier 1 which required the d.c. supply voltage V for their operation.

The data carrier 1 further includes clock signal generating means 12. The clock signal generating means 12 are connected to the receiving means 2 via the connection 4. The received amplitude-modulated carrier signal TS can also be applied to the clock signal generating means 12 via the connection 4. The clock signal generating means 12 enable a clock signal CLK to be regenerated from the received amplitude-modulated carrier signal TS.

The data carrier 1 further includes amplitude demodulation means 13. The amplitude demodulation means 13 are connected to the receiving means 2 via the connection 4. The received amplitude-modulated carrier signal TS can thus be applied to the amplitude demodulation means 13 in order to be demodulated. Furthermore, the regenerated clock signal CLK can be applied from the clock signal generating means 12 to the amplitude demodulation means 13 via an electrically conductive connection 14. With the aid of the clock signal CLK the amplitude demodulation means 13 can demodulate the received amplitude-modulated carrier signal TS, so that after the demodulation process the amplitude demodulation means 13 supply a data signal DS which is representative of the data to be transmitted.

The data carrier 1 further includes data processing means 15 which are basically formed by a microcomputer. The data processing means 15 are adapted to process the data signal DS supplied by the amplitude demodulation means 13. In addition, the data processing means 15 are adapted to perform a number of further operations and processes, which will not be described herein because they are not relevant in the present context.

As already stated, the data processing means 15 are adapted to process the data signal DS supplied by the amplitude demodulation means 13. To process such a data signal the data processing means 15 also require the regenerated clock signal CLK, for which reason this clock signal CLK is applied from the clock signal generating means 12 to the data processing means 15.

The data processing means 15 also enable processed data signals MDS stored in the storage means 16 to be read out of the storage means 16, via the conductive connector 17, and to be processed by the data processing means 15 for subsequent transmission to a transmitting/receiving station. For such a transmission of these data signals DS it is necessary to apply a modulation in dependence on these data signals DS. For this purpose, the data carrier 1 has modulation means 18 connected to the data processing means 15 via an electrically conductive connection 19 and connected to the receiving means 2 via the connection 4. This is because the receiving means 2 also constitute transmitting means which enable a signal modulated by the modulation means 18 in dependence on a data signal DS to be transmitted to a transmitting/receiving station. The modulation means 18 enable for example a load modulation to be applied.

As is apparent from FIG. 1, the clock signal generating means 12, the amplitude demodulation means 13, the data processing means 15, the storage means 16 and the modulation means 18 each have a power supply input 20, 21, 22, 23 and 24, respectively. To each of these power supply inputs 20 to 24 a d.c. supply voltage V can be applied, which voltage has been generated with the aid of the rectifier means 5 and, if necessary, limited with the aid of the voltage limiting means 8.

An advantageous feature of the data carrier 1 of FIG. 1 is that as regards their limiting action for limiting the d.c. supply voltage V to its first limit value UL1 the voltage limiting means 8 are adapted to be controllable by means of a control signal S1. This means, in other words, that the first voltage limiting stage 9 is controllable by means of the control signal S1. Another advantageous feature of the data carrier 1 of FIG. 1 is that as regards their limiting action for limiting the d.c. supply voltage V to its first limit value UL1 the voltage limiting means 8 respond with a delay to amplitude variations in the received amplitude-modulated carrier signal TS. This means, in other words, that the first voltage limiting stage 9 respond with a delay to amplitude variations in the received amplitude-modulated carrier signal TS.

A further advantageous feature of the data carrier 1 of FIG. 1 is that the voltage limiting means 8 are in addition adapted to limit the d.c. supply voltage V generated with the aid of the rectifier means 5 to a second limit value UL2 (see FIG. 2), when necessary, and their limiting action for limiting the d.c. supply voltage V to its second limit value UL2 is such that they respond without delay to amplitude variations in the received amplitude-modulated carrier signal TS.

Figure 2:
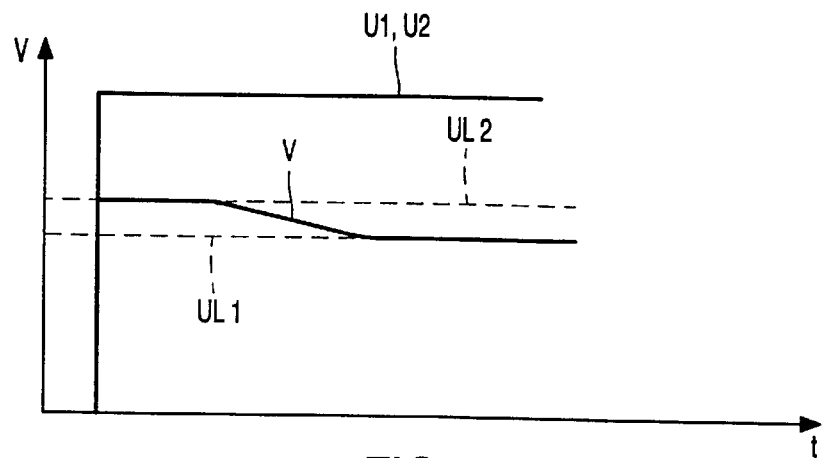
FIG. 2 shows diagrammatically in the form a waveform diagrams of voltages which appear in the data carrier of FIG. 1.

As is apparent particularly from FIG. 2, the design is such that the second limit value UL2 attainable by the voltage limiting means 8 is higher than the first limit value UL1 attainable by the voltage limiting means 8.

In order to limit the d.c. supply voltage V generated with the aid of the rectifier means 5, i.e. with the aid of the second rectifier stage 7, to the second limit value UL2 the voltage limiting means 8 of the data carrier 1 shown in FIG. 1 have a second voltage limiting stage 25 arranged between an electrically conductive connection 26, which is connected to the output of the second rectifier stage 7, and ground. Similarly to the electrically conductive connection 10, to which the first voltage limiting stage 9 is connected, the electrically conductive connection 26, to which the second voltage limiting stage 25 is connected, is connected to the capacitor 11.

The data carrier 1 shown in FIG. 1 comprises first control signal generating means 27 adapted to generate and to supply a first control signal S1 corresponding to the received amplitude-modulated carrier signal TS. The first control signal generating means 27 are arranged after the rectifier means 5, namely after the first rectifier stage 6 of the rectifier means 5. The first control signal generating means 27 thus generate a first control signal S1 corresponding to the rectified carrier signal. The direct voltage generated by rectification of the carrier signal TS by means of the first rectifier stage 6 is applied to the first control signal generating means 27 via the input of these means 27 which is connected to the first rectifier stage 6, not only to form the first control signal S1 but also to provide the power supply for the first control signal generating means 27.

The data carrier 1 shown in FIG. 1 also includes delay means 28 which follow the first control signal generating means 27. The first control signal S1 generated by the first control signal generating means 27 can be applied to the delay means 28 in order to delay this signal. The delay means 28 are followed by the voltage limiting means 8, i.e. by the first voltage limiting stage 9 of the voltage limiting means 8. With regard to their limiting action for limiting the d.c. supply voltage V to the first limit value UL1, the voltage limiting means 8, i.e. the first voltage limiting stage 9, respond with a delay to amplitude variations in the received amplitude-modulated carrier signal TS in dependence on the delayed first control signal S1 supplied by the delay means 28.

The data carrier 1 shown in FIG. 1 in addition includes second control signal generating means 29 adapted to generate and to supply a second control signal S2 corresponding to the received amplitude-modulated carrier signal TS. The second control signal generating means 29 are also arranged after the rectifier means 5, namely after the second rectifier stage 7 in this case, so that the direct voltage generated by rectification of the carrier signal TS by means of the second rectifier stage 7 is applied to the second control signal generating means 29 both in order to provide the power supply for the second control signal generating means 27 and in order to generate the second control signal S2. The second control signal generating means 29 thus generate a second control signal S2 corresponding to the rectified carrier signal.

The second control signal S2 generated and supplied by the second control signal generating means 29 can be applied without delay to the voltage limiting means 8, namely to the second voltage limiting stage 25 of the voltage limiting means 8 in the present case. With regard to their limiting action for limiting the d.c. supply voltage V to the second limit value UL2, the voltage limiting means 8, i.e. the second voltage limiting stage 25, respond without delay to amplitude variations in the received amplitude-modulated carrier signal TS in dependence on the second control signal S2 supplied by the second control signal generating means 29.

The relevant part of the operation of the data carrier 1 shown in FIG. 1 will now be described hereinafter.

When the data carrier shown in FIG. 1 enters into communication with a transmitting/receiving station this can be effected in different ways with regard to the distance between the data carrier 1 and the transmitting/receiving station. During a communication process the data carrier 1 can, for example, be situated at a comparatively large distance from the transmitting/receiving station, which is often referred to as the presence in the so-called far field of a transmitting/receiving station. The distance between the data carrier 1 and the transmitting/receiving station may then be, for example, one meter. The carrier signal TS transmitted by the transmitting/receiving station is then received by the receiving means 2 of the data carrier 1 with a comparatively low level, as a result of which the voltage limiting means 8 are not activated and thus have no adverse effect on the modulation percentage of the received amplitude-modulated carrier signal TS.

However, during data communication with a transmitting/receiving station the data carrier 1 may also be situated in the so-called near field of this station, i.e. at a distance of only a few centimeters from this station. In this case an amplitude-modulated carrier signal received by the receiving means 2 of the data carrier 1 has a comparatively high level, which in the case that the voltage limiting means 8 had not been provided would have the consequence that, as is shown in FIG. 2, the first rectifier stage 6 would supply a direct voltage of the value U1 and the second rectifier stage 7 would supply a direct voltage of the value U2, which preferably corresponds to the value U1. However, the voltage limiting means 8 limit the direct voltages supplied by the two rectifier stages 6 and 7, the second voltage limiting stage 25, which responds without delay, initially causing the d.c. supply voltage V to be limited to the second limit value UL2. Subsequently, as a result of the action of the delay means 28 the first rectifier stage 9, which responds with a delay, takes effect increasingly and causes the d.c. supply voltage V to be limited to the first limit value UL1 required for powering the circuit parts 12, 13, 15, 16 and 18, as can be seen in FIG. 2.

Thus, with the aid of the advantageously designed voltage limiting means 8 it is guaranteed in a simple manner that in the data carrier 1 shown in FIG. 1 the d.c. supply voltage V is reliably limited to such a voltage range that the d.c. supply voltage cannot cause an undesired voltage overload of the circuit parts to be energized. Moreover, the advantageous design of the voltage limiting means 8 also ensures that, as a result of their delayed action, the voltage limiting means 8 do not have an equalizing effect on the received carrier signal TS which has an amplitude modulation with a modulation percentage of approximately 10%.

Figure 3:
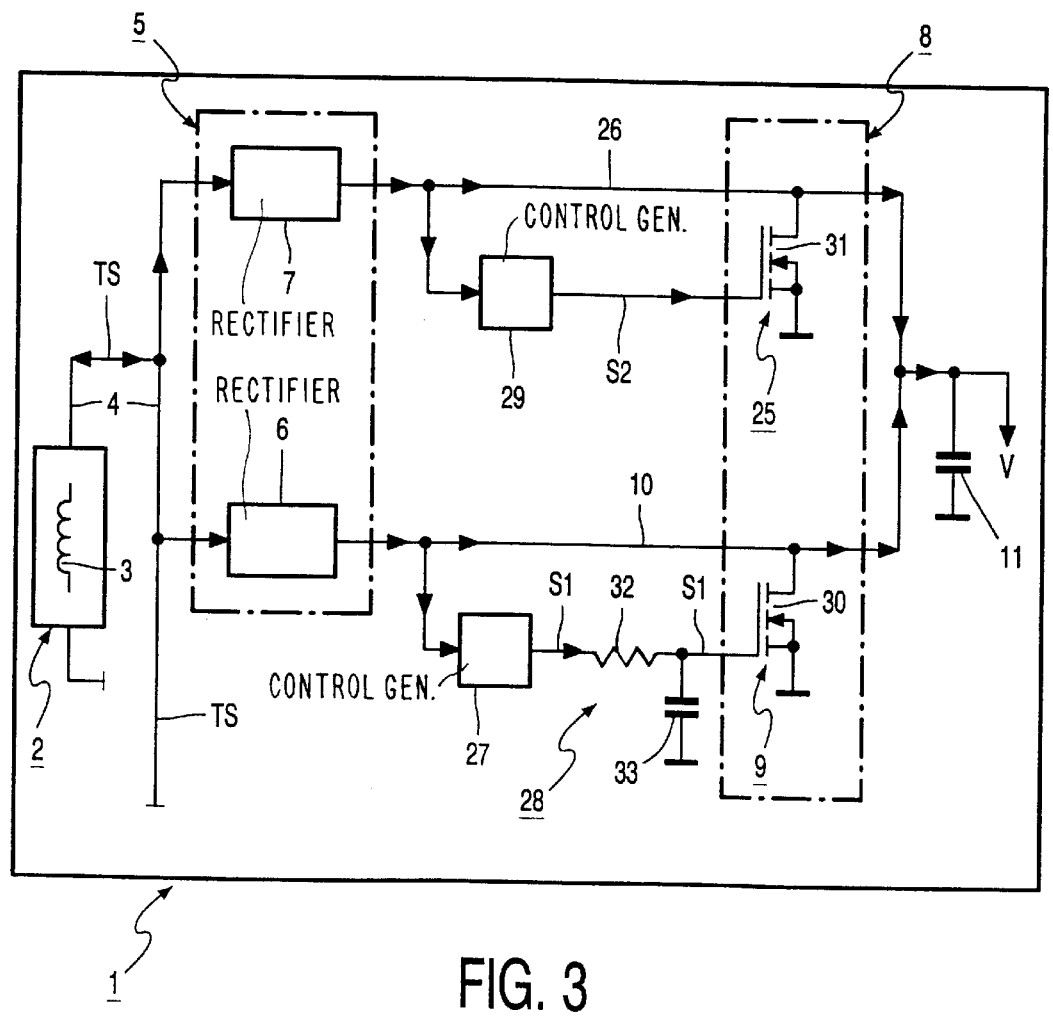
FIG. 3, in the same way as FIG. 1, shows a data carrier in accordance with a second embodiment of the invention.

FIG. 3 shows a data carrier 1 having substantially the same circuit arrangement as the data carrier 1 of FIG. 1, for which reason only that part of the data carrier 1 of FIG. 3 is shown which is involved in the generation of the d.c. supply voltage V.

In the data carrier 1 shown in FIG. 3 the voltage limiting means 8 comprise as first voltage limiting stage 9 for limiting the d.c. supply voltage V to its first limit value UL1 a first electronic circuit element 30 whose resistance is variable in dependence on a first control signal S1 applied to this element. The first electronic circuit element 30 is formed by a FET.

The voltage limiting means 8 comprise as second voltage limiting stage 25 for limiting the d.c. supply voltage V to its second limit value UL2 a second electronic circuit element 31 whose resistance is variable in dependence on a second control signal S2 applied to this element. The second electronic circuit element 31 is also formed by a FET.

In the data carrier 1 shown in FIG. 3 the first control signal S1 supplied by the first control signal generating means 27 and delayed by the delay means 28 can be applied to the first circuit element 30 in order to control the resistance of the first circuit element 30. The second control signal S2 supplied by the second control signal generating means 29 can be applied to the second circuit element 31 in order to control the resistance of the second circuit element 31.

It remains to be noted that the delay means 28 in the data carrier 1 shown in FIG. 3 are formed by a so-called RC element comprising a resistor 32 and a capacitor 33.

Figure 4:
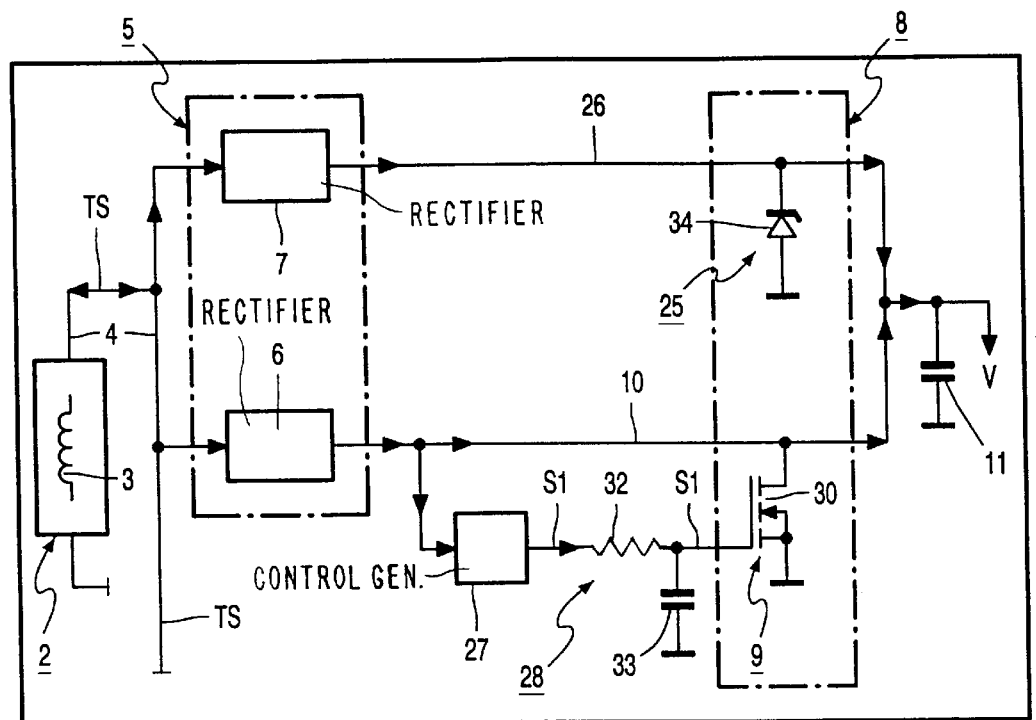
FIG. 4, in the same way as FIGS. 1 and 3, shows a data carrier in accordance with a third embodiment of the invention.

FIG. 4 shows a data carrier 1 which, instead of a second voltage limiting stage which is controllable by a second control signal S2 generated by second control signal generating means 29, simply comprises a second voltage limiting stage 25 formed by a single zener diode 34 in order to limit the d.c. supply voltage V to the second limit value UL2.

Figure 5:
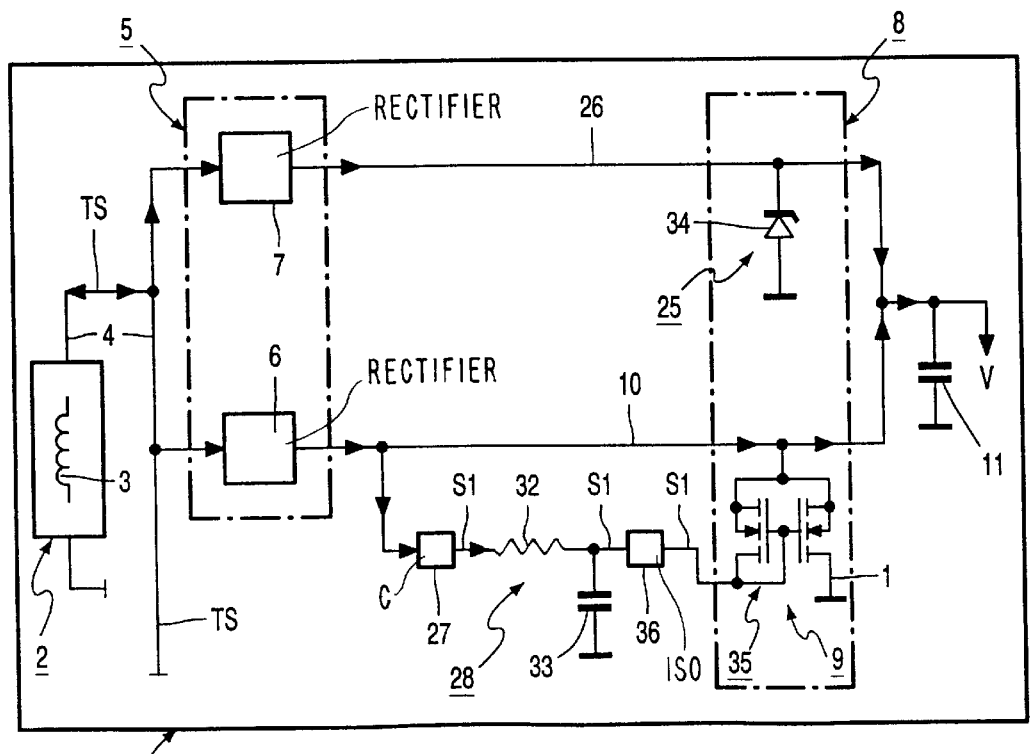
FIG. 5, in the same way as FIGS. 1, 3 and 4, shows a data carrier in accordance with a fourth embodiment of the invention.

As regards the data carrier 1 shown in FIG. 5 it is to be noted that the voltage limiting means 8 for limiting the d.c. supply voltage V to its first limit value UL1 in this data carrier 1 comprise as first voltage limiting stage 9, instead of a first electronic circuit element 30, i.e. a FET, a current sink stage 35 whose sink current I is variable in dependence on a first control signal S1 applied to it. Here, the current sink stage 35 is formed by a FET current mirror circuit, known per se, so that no further explanation is necessary. In the data carrier 1 of FIG. 5 the first control signal S1 supplied by the first control signal generating means 27 and delayed by the delay means 28 can be applied to the current sink stage 35 in order to control the sink current I of the current sink stage 35. This control signal is applied via an isolating stage 36, which ensures that the charge of the capacitor 33 of the delay means cannot be influenced in an undesirable manner via the controllable current sink stage 35.

Figure 6:
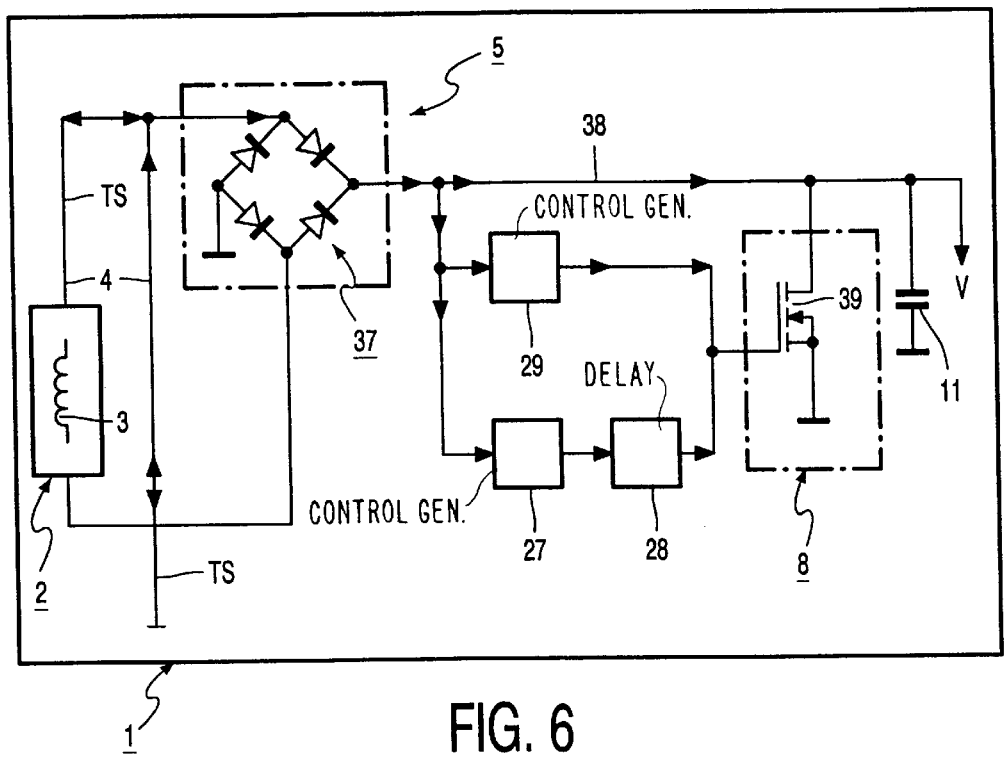
FIG. 6, in the same way as FIGS. 1, 3, 4 and 5, shows a data carrier in accordance with a fifth embodiment of the invention.

FIG. 6 shows a data carrier 1 in which the rectifier means 5 are formed by a single bridge rectifier 37. Both the first control signal generating means 27 and the second control signal generating means 29 are arranged after this bridge rectifier 37 in that they are connected to an electrically conductive connection 38 connected to an output of the bridge rectifier 37. The first control signal generating means 27 are connected via the delay means 28 and the second control signal generating means 29 are connected directly to the control input of, in the present case, a single electronic circuit element 39 of the voltage limiting means 8, which element has a resistance which is variable in dependence on two control signals S1 and S2 and which is arranged to receive the two control signals S1 and S2 for varying its resistance. The electronic circuit element 39 thus forms both the first voltage limiting stage and the second voltage limiting stage of the voltage limiting means 8. The data carrier 1 has the special advantage that the voltage limiting means 8 are realized by means of a single electronic circuit element 39. Instead of the bridge rectifier 37 the data carrier 1 shown in FIG. 6 may include another circuit device for the rectifier means 5.

Figure 7:
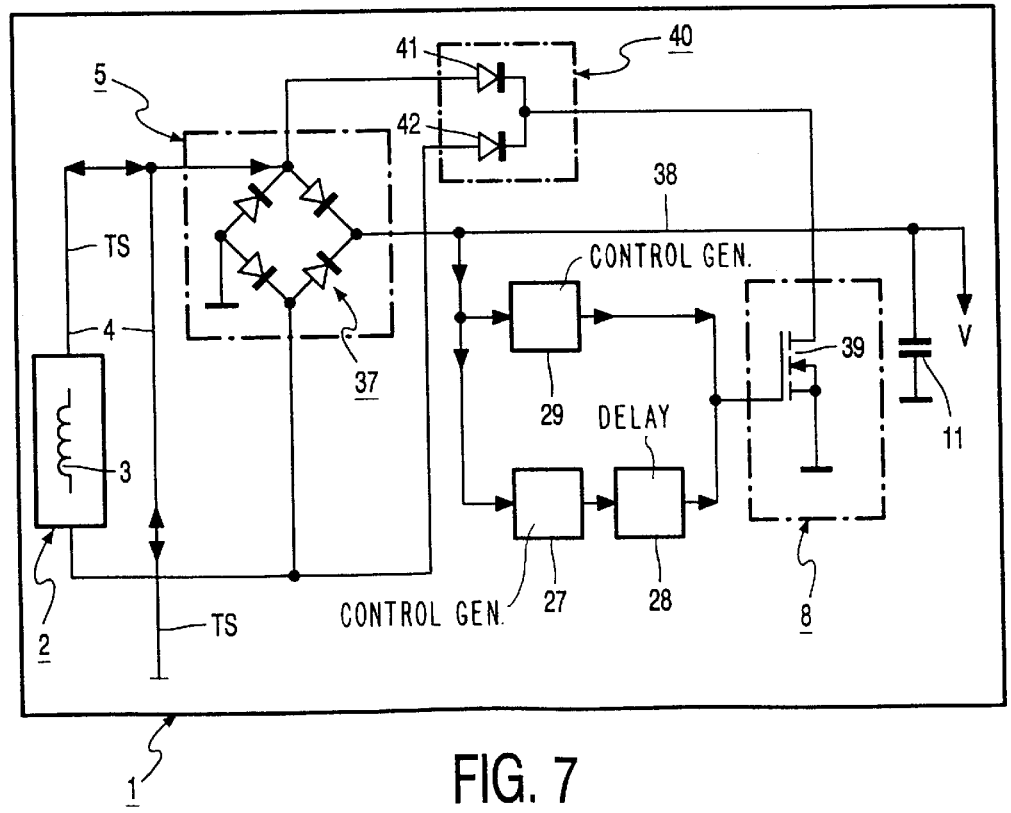
FIG. 7, in the same way as FIGS. 1, 3, 4, 5 and 6, shows a data carrier in accordance with a sixth embodiment of the invention.

FIG. 7 shows a data carrier 1 whose circuit arrangement largely corresponds to the circuit arrangement of the data carrier 1 shown in FIG. 6. A difference with respect to the data carrier 1 of FIG. 1 is that in the data carrier 1 shown in FIG. 7 the inclusion of the electronic circuit element 39 in the circuit arrangement and, consequently, the operation of the electronic circuit element 39.

The data carrier 1 shown in FIG. 7 comprises additional rectifier means 40 formed by two diodes 41 and 42 whose anodes constitute the inputs of the additional rectifier means and whose commoned cathodes form the output of the additional rectifier means 40. At its input side the additional rectifier means 40 are connected to the receiving means 2. At the output side the additional rectifier means 40 are connected to the electronic circuit element 39 of the voltage limiting means 8. In the data carrier 1 shown in FIG. 7 the amplitude of the carrier signal TS applied to the rectifier means 5 by the receiving means 2 can be influenced by means of the single electronic circuit element 39 by variation of its resistance via the additional rectifier means 40, in order to limit the d.c. supply voltage V generated with the aid of the rectifier means 5.

Whereas in the data carrier 1 shown in FIG. 6 the circuit element 39 directly influences and, information necessary, limits the d.c. supply voltage V supplied by the rectifier means 5, the d.c. supply voltage V in the data carrier 1 shown in FIG. 7 is limited indirectly via the additional rectifier means 40. The advantage of the design of the data carrier 1 of FIG. 7 is that circuit-wise Lie circuit element 39 is not connected directly to the capacitor 11 which has been provided for storage purposes, which yields the advantage that the capacitor 11 is not loaded directly by the circuit element 39, which thus precludes inadvertent discharging of the capacitor 11 via the circuit element 39.

The data carriers I as shown in FIGS. 3, 4, 5, 6 and 7 also have the advantages mentioned with reference to the data carrier 1 shown in FIG. 1.

The invention is not limited to the embodiments described hereinbefore by way of example. For the implementation of the voltage limiting means, of the delay means and of the control signal generating means several possibilities are provided by the respective state of the art.

What is claimed is:

1. A data carrier processing system comprising:
   a receiver adapted to receive and to supply a carrier signal which has been amplitude-modulated in dependence on transmitted data,
   one or more rectifiers, operably coupled to the carrier signal, that are adapted to generate a d.c. supply voltage corresponding to the carrier signal,
   a voltage limiter adapted to limit the d.c. supply voltage to a first limit value,
   a demodulator, operably coupled to the carrier signal, that is adapted to supply a data signal representative of the transmitted data, and
   a processor adapted to process the data signal supplied by the demodulator,
   the processor having a power supply input that is arranged to receive the d.c. supply voltage,
   wherein:
   the voltage limiter is adapted to limit the d.c. supply voltage to the first limit value with a delay to amplitude variations in the carrier signal,
   the voltage limiter is further adapted to limit the d.c. supply voltage to a second limit value without delay to amplitude variations in the carrier signal, and
   the second limit value is higher than the first limit value.

2. A data carrier processing system as claimed in claim 1, further including:
   a first control signal generator adapted to generate and to supply a first control signal corresponding to the carrier signal, and
   a delay device, operably coupled between the first control signal generator and the voltage limiter, that is configured to receive the first control signal and to provide therefrom a delayed first control signal, and
   wherein
   the voltage limiter responds with the delay to amplitude variations in the carrier signal in dependence on the delayed first control signal supplied by the delay device.

3. A data carrier processing system as claimed in claim 2, wherein:
   the voltage limiter includes a circuit element whose resistance is variable in dependence on the first control signal.

4. A data carrier processing system as claimed in claim 3, wherein
   the circuit element is formed by a FET.

5. A data carrier processing system as claimed in claim 3, further including:
   a second control signal generator adapted to generate and to supply a second control signal corresponding to the carrier signal, and
   the resistance of the circuit element is also variable in dependence on the second control signal in order to limit the d.c. supply voltage to the second limit value.

6. A data carrier as claimed in claim 5, wherein
   the first control signal generator and the second control signal generator are arranged after the one or more rectifiers and are configured to generate the first and second control signals corresponding to a rectified carrier signal from the one or more rectifiers.

7. A data carrier processing system as claimed in claim 6, further including
additional one or more rectifiers, operably coupled between the receiver and the circuit element, that are configured to also vary the resistance of the circuit element.

8. A data carrier processing system as claimed in claim 6, wherein
the one or more rectifiers are formed by a single bridge rectifier.

9. A data carrier processing system as claimed in claim 2, wherein
the voltage limiter includes a current sink stage whose sink current is variable in dependence on the fist control signal.

10. A data carrier processing system as claimed in claim 9, wherein
the current sink stage is formed by a FET current mirror circuit.

11. A data carrier processing system as claimed in claim 2, further including
a second control signal generator adapted to generate and to supply a second control signal corresponding to the carrier signal without delay to the voltage limiter.

12. A data carrier processing system as claimed in claim 11, wherein
the voltage limiter includes a circuit element for limiting the d.c. supply voltage to the second limit value, and
the second circuit element has a resistance that is variable in dependence on the second control signal.

13. A data carrier processing system as claimed in claim 12, wherein
the circuit element is formed by a FET.

14. A data carrier processing system as claimed in claim 1, wherein
the voltage limiter includes a zener diode for limiting the d.c. supply voltage to the second limit value.

15. A circuit comprising:
one or more rectifiers that are configured to receive a carrier signal which has been amplitude-modulated in dependence on transmitted data and arc adapted to generate a d.c. supply voltage corresponding to the carrier signal,
a voltage limiter adapted to limit the d.c. supply voltage to a first limit value,
a demodulator, operably coupled to the carrier signal that is adapted to supply a data signal representative of the transmitted data, and
a processor adapted to process the data signal supplied by the demodulator,
the processor having a power supply input, which power supply input is arranged to receive the d.c. supply voltage,
wherein:
the voltage limiter is adapted to limit the d.c. supply voltage to the first limit value with a delay to amplitude variations in the carrier signal,
the voltage limiter is adapted to limit the d.c. supply voltage to a second limit value without delay to amplitude variations in the carrier signal, and
the second limit value is higher than the first limit value.

16. A circuit as claimed in claim 15, further including:
a first control signal generator adapted to generate and to supply a first control signal corresponding to the carrier signal, and
a delay device, operably coupled between the first control signal generator and the voltage limiter, that is configured to receive the first control signal and to provide therefrom a delayed first control signal, and
the voltage limiter responds with the delay to amplitude variations in the carrier signal in dependence on the delayed first control signal.

17. A circuit as claimed in claim 16, wherein
the voltage limiter includes a circuit element whose resistance is variable in dependence on the first control signal.

18. A circuit as claimed in claim 17, wherein
the circuit element is formed by a FET.

19. A circuit as claimed in claim 17, further including
a second control signal generator adapted to generate and to supply a second control signal corresponding to the carrier signal, and
wherein
the resistance of the circuit element is also variable in dependence on the second control signal.

20. A circuit as claimed in claim 19, wherein
the first control signal generator and the second control signal generator are arranged after the one or more rectifiers and are configured to generate the first and second control signals corresponding to a rectified carrier signal from the one or more rectifiers.

21. A circuit as claimed in claim 20, further including
a receiver that is adapted to receive and to supply the carrier signal, and
additional one or more rectifiers, operably coupled between the receiver and the circuit element, that are configured to also vary the resistance of the circuit element.

22. A circuit as claimed in claim 20, wherein
the one or more rectifiers are formed by a single bridge rectifier.

23. A circuit as claimed in claim 16, wherein
the voltage limiter includes a current sink stage whose sink current is variable in dependence on the first control signal.

24. A circuit as claimed in claim 23, wherein
the current sink stage is formed by a FET current mirror circuit.

25. A circuit as claimed in claim 16, further including
a second control signal generator adapted to generate and to supply a second control signal corresponding to the carrier signal without delay to the voltage limiter.

26. A circuit as claimed in claim 25, wherein
the voltage limiter includes a circuit element for limiting the d.c. supply voltage to the second limit value, and
the circuit element has a resistance which is variable in dependence on the second control signal.

27. A circuit as claimed in claim 26, wherein
the circuit element is formed by a FET.

28. A circuit as claimed in claim 15, wherein
the voltage limiter includes a zener diode for limiting the d.c. supply voltage to the second limit value.

* * * * *